(12) United States Patent
Mercuriev

(10) Patent No.: US 8,873,825 B2
(45) Date of Patent: Oct. 28, 2014

(54) METHOD OF NOISE REDUCTION IN DIGITAL X-RAYOGRAMS

(71) Applicant: Zakrytoe akcionernoe obshchestvo IMPUL'S, Saint-Petersburg (RU)

(72) Inventor: Sergey Vasilievich Mercuriev, Saint-Petersburg (RU)

(73) Assignee: IMPUL'S Zakrytoe akcionernoe obshchestvo, Saint-Petersburg (RU)

( * ) Notice: Subject to any disclaimer, the term of this patent is extended or adjusted under 35 U.S.C. 154(b) by 101 days.

(21) Appl. No.: 13/772,765

(22) Filed: Feb. 21, 2013

(65) Prior Publication Data

US 2013/0216117 A1 Aug. 22, 2013

(30) Foreign Application Priority Data

Feb. 22, 2012 (EA) .................................. 201200255

(51) Int. Cl.
*G06K 9/00* (2006.01)
*G06T 5/00* (2006.01)

(52) U.S. Cl.
CPC ....... *G06T 5/002* (2013.01); *G06T 2207/10116* (2013.01)
USPC ........................................................ 382/132

(58) Field of Classification Search
CPC ........... G06T 2207/10116–2207/10128; G06T 7/0012; G06T 2207/30004; G06F 19/321
USPC ........................................................ 382/132
See application file for complete search history.

(56) References Cited

FOREIGN PATENT DOCUMENTS

| EP | 1392047 A2 | 2/2004 |
| JP | 9270003 A | 10/1997 |
| RU | 2342701 C1 | 12/2008 |
| RU | 2400815 C2 | 9/2010 |

OTHER PUBLICATIONS

Kim, Yong Sun, et al, Separable Bilateral Nonlocal Means, 2011, 18th IEEE International Conference on Image Processing, 1545-1548.*
Dore, et al., Robust NL-Means Filter with Optimal Pixel-Wise Smoothing Parameter for Statistical Image Denoising, IEEE Transactions on Signal Processing, May 2009, pp. 1703-1716, vol. 57, No. 5.
Buades, et al., Nonlocal Image and Movie Denoising, International Journal of Computer Vision, Jul. 4, 2007, pp. 123-139, v. 76, Springer Science+Business Media, LLC.
Bosco, et al., "Noise Reduction for CFA Image Sensors Exploiting HVS Behaviour," Sensors, 2009, pp. 1692-1713, vol. 9.

(Continued)

*Primary Examiner* — Barry Drennan
*Assistant Examiner* — Menatoallah Youssef
(74) *Attorney, Agent, or Firm* — Patentbar International, P.C.

(57) ABSTRACT

The invention relates to the field of digital image processing and can find use in suppression of noise in digital images, formed by high-energy radiation, including X-ray radiation. Specifically, the invention relates to a method for suppression of noise in digital x-ray images. The objective of the invention is to provide a method for noise suppression in digital X-ray images that has extended functionality, specifically, a method that makes it possible to reduce residual noise level and amount of artifacts in the form of discontinuities, directed along local orientation of object borders in textured image areas, to reduce residual LF noise level, and to eliminate over-smoothing (excessive filtering) of fine details. The technical innovation achieved is the improvement of digital image processing quality.

4 Claims, 5 Drawing Sheets

(56) References Cited

OTHER PUBLICATIONS

Buades, et al., "A Review of Image Denoising Algorithms, with a New One," Multiscale Model. Simul., 2005, pp. 490-530, vol. 4, No. 2.

Buades, et al., "Image Denoising by Non-Local Averaging," 2005, pp. II-25 to II-28.

Buades, et al., "On Image Denoising Methods," pp. 1-40.

Buades, et al., "The Staircasing Effect in Neighborhood Filters and its Solution," IEEE Transactions on Image Processing, 2006, pp. 1-7.

Burt, et al., "The Laplacian Pyramid as a Compact Image Code," IEEE Transactions on Communications, Apr. 1983, pp. 532-540, vol. COM-31, No. 4.

Candès, et al., "Curvelets, Multiresolution Representation, and Scaling Laws," 12 pages.

Dauwe, et al., "A Fast Non-Local Image Denoising Algorithm," SPIE, 2008, pp. 681210-681211 thru 681210-681218, vol. 6812.

Foi, "Practical Denoising of Clipped or Overexposed Noisy Images," 5 pages.

Foi, "Practical Poissonian-Gaussian noise modeling and fitting for single-image raw-data," IEEE Transactions, 2007, 18 pages.

Förstner, "Image Preprocessing for Feature Extraction in Digital Intensity, Color and Range Images," 25 pages.

Gino, M. Colleen, "Noise, Noise, Noise," 11 pages.

Hensel, et al., "Robust and Fast Estimation of Signal-Dependent Noise in Medical X-Ray Image Sequences," pp. 46-50.

Jahne, B., "Digital Image Processing, 6th revised and extended version," Jan. 2005, 621 pages, Springer-Verlag Berlin Heidelberg.

Kervrann, et al., "Optimal Spatial Adaptation for Patch-Based Image Denoising," IEEE Transactions on Image Processing, Oct. 2006, pp. 2866-2878, vol. 15, No. 10.

Liu, et al., "Automatic Estimation and Removal of Noise from a Single Image," IEEE Transactions on Pattern Analysis and Machine Intelligence, Feb. 2008, pp. 299-314, vol. 30, No. 2.

Mahmoudi, et al., "Fast Image and Video Denoising via Nonlocal Means of Similar Neighborhoods," IEEE Signal Processing Letters, Dec. 2005, pp. 839-842, vol. 12, No. 12.

Dinesh peter J, et al., "Robust Estimation Approach for Nonlocal-means Denoising Based on Structurally Similar Patches," Int. J. Open Problems Compt. Math., Jun. 2009, pp. 293-310, vol. 2, No. 2.

Press, et al., "Numerical Recipes in C, The Art of Scientific Computing, Second Edition," 1992, 1178 pages, Cambridge University Press.

Rudin, et al., "Nonlinear total variation based on noise removal algorithms," Physica D 60, 1992, pp. 259-268.

Salmeri, et al., "Signal-dependent Noise Characterization for Mammographic Images Denoising," 16th IMEKO TC4 Symposium, Sep. 22-24, 2008, 6 pages, Florence, Italy.

Selesnick, Ivan W., "The Double-Density Dual-Tree DWT," IEEE Transactions on Signal Processing, May 2004, pp. 1304-1314, vol. 52, No. 5.

Starck, et al., "Image processing and data analysis, The multiscale approach," 315 pages.

Strang, et al., "Wavelets and Filter Banks," 440 pages, Wellesley-Cambridge Press, U.S.A.

Tomasi, et al., "Bilateral Filtering for Gray and Color Images," Proceedings of the 1998 IEEE International Conference on Computer Vision, Bombay, India, 8 pages.

Vetterli, et al., "Wavelets and Subband Coding," 251 pages, Prentice Hall PTR, New Jersey.

Waegli, Barbara, "Investigations Into the Noise Characteristics of Digitalized Aerial Images," Proceedings ISPRS Comm. II Symposium, Cambridge, UK, Jul. 13-17, 1998, 8 pages.

Wang, et al., "Fast Non-Local Algorithm for Image Denoising," IEEE, 2006, pp. 1429-1432.

Weichert, J., "Anisotropic Diffusion in Image Processing," 1998, 184 pages, B.G. Teubner Stuttgart.

Kingsbury, Nick, "The Dual-Tree Complex Wavelet Transform, A New Technique for Shift Invariance and Directional Filters," 4 pages.

\* cited by examiner

METHOD OF NOISE REDUCTION IN DIGITAL X-RAYOGRAMS

RELATED APPLICATIONS

This application claims priority to Eurasian Patent Application No. EA 201200255, filed Feb. 22, 2012, which is incorporated herein by reference in its entirety.

FIELD OF THE INVENTION

The invention relates to the field of digital image processing and can find use in solving problems of noise suppression in digital images, formed by high-energy radiation, including X-ray radiation. Specifically, the invention relates to a method for suppression of noise in digital x-ray images.

BACKGROUND OF THE INVENTION

In current clinical practice, various image processing methods are used to correct and facilitate interpretation of digital X-ray images, including: sharpening, enhancing of anatomical structure imaging, automatic targeting of range of interest etc. Some of the most important methods for X-ray image enhancement include noise suppression methods. Noise suppression ensures better visual perception and distinctiveness of low-contrast details and improves quality of execution of other image processing algorithms. Therefore, one of high priority tasks in modern digital radiology is to develop noise filtering methods, capable of preserving diagnostically relevant information and providing high-speed processing at significant levels of noise, dependent on signal intensity.

One can identify two major problems, faced by a researcher who undertakes to develop a digital X-ray image filtering algorithm. The first problem refers to estimation of image noise level, which essentially depends on signal intensity. The second problem refers to development of a filtering method that would ensure the right balance between filtering quality and filtering speed. A closer look should be taken at each of these problems.

The problem of estimation of noise, dependent on signal intensity, can be summarized as follows. Practically any qualitative method for digital image noise filtering involves use of data on amplitude and spectral distribution of noise. In fairly wide range of noise suppression methods, noise variance value is utilized as a parameter. Publications by various authors often use a model, which addresses to digital image noise as a stationary random process with normal amplitude distribution and spectral distribution of white noise. Also, studies of non-stationary noise suppression problem are underway, to be more specific, with regards to noise with signal-dependent variance, and it has been shown that the more accurate is the known noise variance value, the more effective is the noise suppression process [Bosco et. al., Noise Reduction for Cfa Image Sensors Exploiting Hvs Behavior, Sensors 9(3), 1692-1713, 2009; Foi, Practical Denoising of Clipped or Overexposed Noisy Images, Proc. 16th European Signal Process. Conf., EUSIPCO, 2008].

The nature of digital X-ray image noise should be examined. A detector measures intensity of attenuated (by passing through the object examined) X-ray radiation. During imaging each detector cell accumulates the average of $\overline{N}$ electrons due to absorption of photons. The quantity of accumulated electrons N can be simulated as a Poisson distributed random variable:

$$P(N = n) = \exp(-\overline{N})\frac{\overline{N}^n}{n!}, n \geq 0.$$

Accidental fluctuations of the number of absorbed photons are called photon noise. In modern detectors, photon noise is the primary source of noise. Additional sources include detector system noises, such as: reading noise, thermal noise, amplifier noise, quantization distortion etc. Cumulative effect of such noises is simulated as a Gaussian distributed random variable [Bosco et. al., *Noise Reduction for Cfa Image Sensors Exploiting Hvs Behavior, Sensors* 9(3), 1692-1713, 2009; Foi et. al., *Practical poissonian-gaussian noise modeling and fitting for single-image raw-data, Image Processing, IEEE Transactions*, TIP-03364-2007-FINAL]. According to a widely used model, in linear electronic circuits variance of photon noise and additional noises is linearly dependent on useful signal value [Yane, *Digital image processing*, Moscow, *Technosphera*, 2007]

$$\sigma^2(u(p))=au(p)+b, \tag{1}$$

where u(p) represents signal intensity level in pixel p=(i, j) of an image, and $\sigma^2(u(p))$ represents noise variance dependence on signal intensity.

Therefore digital image noise is linearly dependent on signal intensity. There is a considerable number of publications on the problem of estimation of signal-dependent noise [Bosco et. al., Noise Reduction for Cfa Image Sensors Exploiting Hvs Behavior, Sensors 9(3), p. 1692-1713, 2009;

Foi et. al., Practical poissonian-gaussian noise modeling and fitting for single-image raw-data, Image Processing, IEEE TRANSACTIONS, TIP-03364-2007-FINAL.

Förstner, Image Preprocessing for Feature Extraction in Digital Intensity, Color and Range images, In Springer Lecture Notes on Earth Sciences, 1998;

Hensel et. al., Robust and Fast Estimation of Signal-Dependent Noise in Medical X-Ray Image Sequences, Springer, Proceedings BVM 2006, Hamburg, Germany, March 19-21, p. 46-50, 2006;

Liu et. al., Automatic estimation and removal of noise from a single image, IEEE Transactions on Pattern Analysis and Machine Intelligence, p. 1-35, October, 2006;

Salmeri et. al., *Signal-dependent Noise Characterization for Mammographic Images Denoising*. 16th IMEKO TC4 Symposium (IMEKOTC4 '08), Florence, Italy, 2008;

Waegli, Investigations into the Noise Characteristics of Digitized Aerial Images, In: Int. Arch. For Photogr. And Remote Sensing, Vol. 32-2, 1998]. For example, the following study [Hensel et. al., Robust and Fast Estimation of Signal-Dependent Noise in Medical X-Ray Image Sequences, Springer, 2006] refers to establishing a distribution-free method for frame-by-frame estimation of noise in series of digital X-ray images, specifically emphasizing development of an algorithm, suitable for real-time execution. The study [Foi et. al., Practical poissonian-gaussian noise modeling and fitting for single-image raw-data, Image Processing, IEEE Transactions on 17, 1737-1754, 2008] describes a two-parameter approach to digital image noise estimation. Noise of original digital image (as captured by detector and not yet subjected to non-linear transformations such as gamma correction etc.) is simulated based on a random variable, which represents an additive to the signal:

$$u_n(p)=u(p)+\sigma^2(u(p))n(p), \tag{2}$$

where $u_n(p)$ represents signal intensity level in pixel p of the noisy image observed, and $\sigma^2(u(p))$ represents noise variance dependence on intensity of a signal of type (1), and n(p)∈N(0,1) represents a standard normal random variable. The above study advances a method for tracing noise variance simulation curves, which takes into account sensor nonlinearities, causing underexposure and overexposure, i.e. delinearity at the edges of dynamic range.

The second problem refers to necessity to achieve balance between filtering quality and high-speed filtering requirement. In modern X-ray units, the necessity for rapid high-resolution image processing is somewhat contradictory to commitment to high filtering quality. By now, there has been developed and put to use an extensive mathematical apparatus, related to digital image noise suppression challenge. In general, virtually any noise suppression method can be assigned to one of two classes of filtering methods:

filtering in image transformation space;
filtering in original image space.

The first group of methods (filtering in transformation space) refers to conversion of an original image by applying some transformation. Such transformation is followed by processing transformation factors based on a certain rule, e.g. by applying an appropriate nonlinear operator. This kind of processing is aimed at reduction of noise energy and, possibly, enhancing image sharpness. The final stage of the filtering process is image reconstruction by inverse transformation. This group includes a wide range of methods based on: Fourier transform, wavelet transform [Strang et. al., *Wavelets and Filter Banks*, Wellesley-Cambridge Press.; Vetterli et. al., *Wavelets and Subband Coding*, Prentice Hall, Englewood Cliffs, N.J., 1995], complex wavelet transform [Kingsbury, *The dual-tree complex wavelet transform: A new technique for shift invariance and directional filters*, In Proc. 8th IEEE DSP Workshop, Utah, Aug. 9-12, 1998, paper no. 86; Selesnick, *The double-density dual-tree discrete wavelet transform*. IEEE Trans. Signal Processing, vol. 52, no. 5, pp. 1304-1314, May 2004], curvelet transform [Candes et. al., *Curvelets, multiresolution representation, and scaling laws*, In SPIE conference on Signal and Image Processing: Wavelet Applications in Signal and Image Processing VIII, San Diego, 2000] etc. Execution speed and filtering quality in this class of methods are determined by transformation type and factor processing method used.

The second group of methods (filtering in original image space) includes equally extensive list of approaches, including: anisotropic diffusion [Weickert, *Anisotropic Diffusion in Image Processing*. Tuebner Stuttgart, 1998], variation based algorithms [Rudin et. al., *Nonlinear total variation based noise removal algorithms*, Physica D, 60:259-268, 1992], bilateral filtering [Tomasi et. al., *Bilateral Filtering for Gray and Color Images*, In Proc. 6th Int. Conf Computer Vision, New Delhi, India, 1998, pp. 839-846], non-local means filtering [Buades et. al., *On image denoising methods, SIAM Multiscale Modeling and Simulation*, 4(2):490-530, 2005], regression filtering [Takeda et. al., *Kernel regression for image processing and reconstruction, IEEE Transactions on Image Processing*, vol. 16, no. 2, pp. 349-366, February 2007], optimal spatial adaptation filtering [Kervrann et. al., *Optimal spatial adaptation for patch-based image denoising. IEEE Transactions on Image Processing*, vol. 15, no. 10, October 2006] etc. As a rule, such methods reduce to searching for similarity in pixels or groups of pixels (blocks or patches) within the image itself, possibly based on geometric data (such as local orientation of image structures), and application of some pattern for modification (equalization) of brightness of such pixels, whereby modification rate is dependent on degree of similarity of pixels (pixel blocks).

SUMMARY OF THE INVENTION

The present invention proposes a method for noise filtering in digital X-ray images that includes two stages. The first stage involves development of estimation of signal-dependent noise. The second stage involves noise suppression and includes a number of additional substeps, such as: combined bilateral non-local filtering, pyramid reduction of residual low-frequency noise and over-smoothing correction.

The closest to the digital X-ray image noise estimation method disclosed herein is the method described in the following publication [Hensel et. al., Robust and Fast Estimation of Signal-Dependent Noise in Medical X-Ray Image Sequences, Springer, 2006], according to which the following operations are sufficient to build an estimation of signal-dependent noise based on an original image:

Estimate useful signal by means of low-frequency filtering of the original image and calculate difference between the original image and its estimation, thus forming a noise image;

Use some appropriate method to remove pixel values of the noise image that are associated with abrupt changes of the original image (borders and single hot pixels);

Divide intensity range of the estimation image into intervals and, with regard to each interval, accumulate values of noise image pixels, associated with noise estimation image pixels;

Calculate noise variance in each intensity interval based on values of noise image pixels, accumulated in such interval.

The present invention utilizes principles of noise estimation, outlined in the above publication. The most significant distinctions include: (a) deletion of values of noise image pixels, associated with abrupt changes of original image, by means of morphological enhancement of the values of noise image pixels, associated with original image borders; and (b) use of robust local linear approximation of noise variance interval estimations to create a tabulated function that describes noise-signal dependency; and (c) based on estimation image and the obtained tabulated function, calculation of noise map in the form of an image that represents a pixel-by-pixel estimation of noise variance in the original digital image.

The nearest equivalent of the method for noise suppression in digital X-ray images, used in the present invention, is non-local means filtering [Buades et. al., On image denoising methods, SIAM Multiscale Modeling and Simulation, 4(2): 490-530, 2005]. Non-local means filter shows good results when used to suppress noise in digital images. This filter uses area averaging to estimate current pixel signal intensity:

$$\hat{u}(p) = \sum_{q \in S(p,t)} w(p,q) u(q) \bigg/ \sum_{q \in S(p,t)} w(p,q). \quad (3)$$

where $S(p,t)$ represents an area of radius t, centered at the current pixel p (i.e. area of $2 \cdot t+1 \times 2 \cdot t+1$ pixels in size); $w(p,q) = F(\|U(p,f) - U(q,f)\|_{2,a}, \sigma, k)$ represents weight of averaging, and F represents a decreasing function; $U(p,f)$, $U(q,f)$ represent pixel blocks of radius $f$, centered at pixels p and q, respectively;

$$\|U(p,f)-U(q,f)\|_{2,a} = \sqrt{\sum_{h \in S(0,f)} G(h,a) \cdot (u(p+h)-u(q+h))^2}$$

represents Euclidean distance between pixel blocks, weighted by Gaussian function $G(h,a)=\exp(-h \cdot h^T/a^2)$; $\sigma$ represents RMS error of image noise; k represents a parameter that defines averaging rate; u(q) represents pixel intensity in the original image, and $\hat{u}(p)$ represents resultant estimation of intensity of the current pixel.

In standard interpretation, e.g. as described in [Buades et. al., Image Denoising by Non-Local Averaging, Proc. of IEEE Int. Conf. on Acoustics, Speech, and Signal Processing, vol. 2, pp. 25-28, March 2005], weight function is defined as $$F(\|U(p,f)-U(q,f)\|_{2,a},\sigma,k)=\exp(-\|U(p,f)-U(q,f)\|_{2,a}^2/k^2\sigma^2);$$

and noise is regarded as an additive of homoscedasticity, i.e. noisy image model is defined by type (2) formula, where $\sigma^2(u(p))=\sigma^2=const$ for any pixel p. Basic non-local filtering sequence, outlined above, had served as a basis for a wide range of studies, related to various aspects of improvement, acceleration and practical application of non-local means filter [Bilcu et. al., *Fast non-local means for image de-noising, In Digital Photography III Proc. of SPIE IS&T*, Russel A. Martin, Jeffrey M. DiCarlo, and Nitin Sampat, Eds., February 2007, vol. 6502; Dauwe et. al., *A Fast Non-Local Image Denoising Algorithm, In Proc. SPIE Electronic Imaging*, vol. 6812, San Jose, USA, January 2008; Mahmoudi et. al., *Fast image and video denoising via nonlocal means of similar neighborhoods, IEEE Signal Processing Letters*, 12(12).839-842, 2005; Peter et. al., *Robust estimation approach for non-local-means denoising based on structurally similar patches, Int. J. Open Problems Compt. Math.*, vol. 2, no. 2, June 2009; Wang et. al., *Fast non-local algorithm for image denoising, In Proc. of IEEE International Conference on Image Processing (ICIP)*, 2006, pp. 1429-1432].

Non-local means filter is notable for high computational complexity. One of possible ways to speed up operation of non-local means filter was described in [Buades et. al., *A review of image denoising algorithms, with a new one, Multiscale Modeling and Simulation (SIAM interdisciplinary journal)*, Vol. 4 (2), pp. 490-530, 2005], where it is proposed to use vectorial non-local mean.

In that algorithm version, image I(p) is partitioned into the M of blocks $U(p_m,f)$, m=1,M, $$I(p) = \bigcap_{m=1}^{M} U(p_m, f),$$

where $p_m$ represents a central pixel of partition block. Partition blocks are assumed to overlap. Estimation of intensity levels of pixels of the current partition block is made based on the following formula $$\hat{U}(p_m, f) = \sum_{q \in S(p_m,t)} w(p_m, q)U(q, f) \Big/ \sum_{q \in S(p_m,t)} w(p_m, q). \quad (4)$$

where $w(p_m,q)=\exp(-\|U(p_m,f)-U(q,f)\|_2^2/k^2\sigma^2)$ represents blocks averaging weight;

$$\|U(p_m,f)-U(q,f)\|_2^2 = \sum_{h \in S(0,f)} (u(p_m+h)-u(q+h))^2$$

represents squared Euclidean distance between current pixel block and comparison pixel block; and $\hat{U}(p_m,f)$ represents the resultant estimation of intensity levels of pixels in current partition block. Final block estimations are integrated with averaged overlapping of blocks, thus forming filtered output image. Using vector-based process allows significant filter speed up, however, with a certain loss of processed image quality.

The outlined basic filtering process (3),(4) has a number of downsides:

High level of residual noise and specific artifacts in the form of discontinuities, directed along local orientation of object borders in textured image areas;

Presence of residual LF noise;

Excessive filtering (over-smoothing) of small details.

The objective of the present invention is to provide a method for noise suppression in digital X-ray images that has extended functionality, specifically, a method that makes it possible to reduce residual noise level and amount of artifacts in the form of discontinuities, directed along local orientation of object borders in textured image areas, to reduce residual LF noise level, and to eliminate over-smoothing (excessive filtering) of fine details.

In terms of the claimed method for digital X-ray image noise suppression, comprising:
original image acquisition;
estimation of signal-dependent noise variance;
combined bilateral non-local filtering;
suppression of residual low-frequency noise; and
over-smoothing correction,
the objective, i.e. improvement of digital X-ray image processing quality, is accomplished by:
morphological elimination of values of noise image pixels, associated with borders in the original image, at signal-dependent noise variance estimation stage;
using robust piecewise linear approximation of interval estimations of noise variance to obtain a tabulated function of noise-signal dependency;
calculating a noise map in the form of pixel-by-pixel estimation of noise variance in the original image;
averaging by combining non-local means filter and bilateral filter weights at combined bilateral non-local filtering stage;
using a pyramid method with residual low-frequency noise filtering by a bilateral filter at residual low-frequency noise reduction stage; and
obtaining a result image and correction of over-smoothing by combining the final image and the original image based on their structural and pixel similarity.

In an optional embodiment of the present invention, at combined bilateral non-local filtering stage, averaging weights are calculated based on an image, smoothed by applying linear LF filter.

Another optional embodiment of the present invention involves application of combined weight function in the form of fixed weight fractions of non-local means filter and bilateral filter at combined non-local bilateral filtering stage; at the final stage outputs of these filters are combined.

Another optional embodiment of the present invention involves application of separable version of bilateral filter at combined bilateral non-local filtering stage, involving separation of non-local means filtering and bilateral filtering.

BRIEF DESCRIPTION OF THE DRAWINGS

The claimed technical solution, as well as potential for its practical implementation and accomplishment of its practical objective, outlined above, are illustrated in FIGS. 1 through 5.

DETAILED DESCRIPTION OF THE PREFERRED EMBODIMENTS

Figure 1:
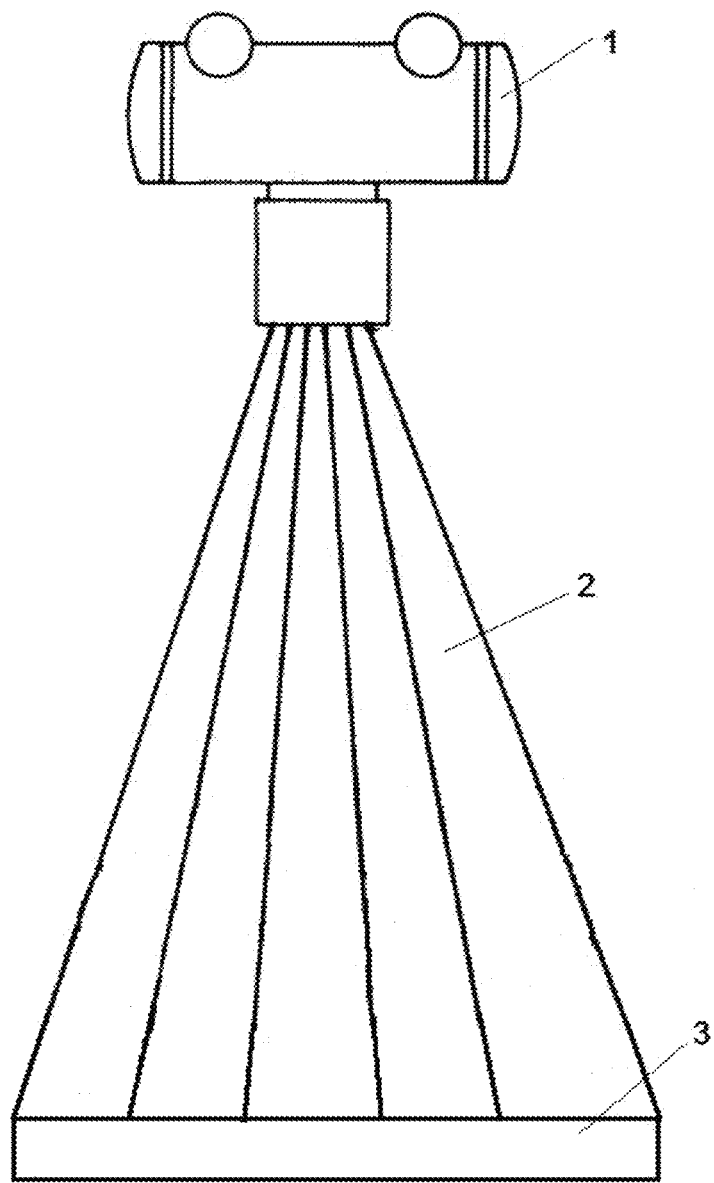
FIG. 1 shows X-ray imaging device

X-ray images can be produced, for example, by a device shown in FIG. 1. It includes X-ray tube 1, emitting X-ray beam 2. X-ray beam 2 enters detector 3. Detector 3 includes scintillation screen (not shown) and matrix array camera (not shown). Scintillation screen is optically connected to the active area surface of the matrix array camera. X-ray beam 2 hits detector 3, and scintillation screen converts it into visible light, which is further converted by detector sensors into a digital image.

A filter, proposed by the present invention, is used to perform 4-stage noise suppression. Each of these stages is examined in detail below.

Stage 1. Estimation of noise variance, dependent on signal intensity. At this stage, original image is first estimated by applying linear low-frequency image filtering [Hensel et. al., Robust and Fast Estimation of Signal-Dependent Noise in Medical X-Ray Image Sequences, Springer, 2006]. To meet strict filtering speed requirements, it is reasonable to use simple linear filtering (e.g. by applying binomial filter). The resulting smoothed image is used to obtain a noise image, which essentially represents the difference between the original and the filtered images.

Image estimation by applying simple image filters is not perfect, as image edges tend to become over-smoothed. As a result, using difference between the original image and the smoothed image leads to forming a noise image, which includes, in addition to noise pixels in smoothed areas, a certain amount of pixels, associated with abrupt changes (i.e. borders of anatomical structures; such pixels are hereafter referred to as non-noise pixels). Such pixels can considerably distort the estimated variance value and should be excluded from calculations. This can be accomplished by various methods [Foi et. al., Practical poissonian-gaussian noise modeling and fitting for single-image raw-data. Image Processing, IEEE Transactions on 17, 1737-1754 (October 2008), Salmeri et. al., Signal-dependent Noise Characterization for Mammographic Images Denoising. IMEKO TC4 Symposium (IMEKOTC4 '08), Firenze, Italy, September 2008], which essentially boil down to thresholding of smoothed derivatives of the original image, where threshold value is determined by local estimation of signal/noise relationship. In image areas with large number of details such estimation usually proves to be inadequate. Therefore, as far as rejection of borders is concerned, this invention proposes a simpler approach to border enhancement that does not require calculation of derived and local estimates of standard deviation. Such morphological approach to non-noise pixels rejection can be summarized as follows:

The noise image is divided into two components—binary images of positive and negative changes;

To enhance areas, associated with borders, resulting images are subjected to morphological operations of erosion, followed by dilatation;

Processed images are combined to receive a single binary image, i.e. a map of original image borders.

To better preserve fine structures, morphological erosion and dilatation are performed by small size masks (2×2 window).

Calculation of interval estimations of noise variance involves identifying minimum and maximum intensity of estimation image (intensity range edges), followed by selection of partitioning interval, e.g., equal to 32 gray gradations. After that, for each image pixel it is necessary to identify an interval that pixel's value pertains to, and to use the relevant noise image pixel value to calculate noise variance estimation within that interval (this involves eliminating pixels that are associated with borders). In calculating interval estimation of noise variance, various formulas may be applied, such as standard unbiased estimator or robust estimation, based on median absolute deviation formula [Hensel et. al., Robust and Fast Estimation of Signal-Dependent Noise in Medical X-Ray Image Sequences, Springer, 2006; Foi et. al., Practical poissonian-gaussian noise modeling and fitting for single-image raw-data, Image Processing, IEEE Transactions on 17, 1737-1754, 2008]. This procedure results in a tabulated function that defines noise variance dependence on signal intensity.

Inaccuracies in generation of borders map may cause serious errors in calculation of variance interval estimations. Therefore such estimations are refined by applying iterative outlier removal technique [Hensel et. al., Robust and Fast Estimation of Signal-Dependent Noise in Medical X-Ray Image Sequences, Springer, 2006]: specifically, this involves iterative elimination in each interval of noise pixels values that exceed in absolute magnitude a threshold, equal to three standard noise deviations, followed by recalculation of noise variance estimation in that interval.

Once calculation of noise variance interval estimations is completed, estimation of noise variance dependence on signal intensity is performed. Using a parametric estimator, it is basically possible to develop a noise model parameters estimation (1), using some of available methods (e.g. least-squares method, likelyhood function minimization or directed optimization). It is also possible to account for sensor nonlinearities [Foi et. al., *Practical poissonian-gaussian noise modeling and fitting for single-image raw-data, Image Processing, IEEE Transactions on* 17, 1737-1754, 2008]. However, as was noted in [Hensel et. al., *Robust and Fast Estimation of Signal-Dependent Noise in Medical X-Ray Image Sequences*, Springer, 2006], for a number of reasons, development of parametric model, able to adequately define noise variance dependence on signal intensity, can pose serious difficulties. Such reasons might include sensor operational nonlinearities, or nonlinear original image preprocessing techniques (such as logarithmation). Therefore, from the point of view of implementation convenience and application versatility, the optimum approach is the one that involves development of non-parametric noise-signal dependency estimation based on estimations of interval variance.

Figure 2:
FIG. 2 shows X-ray image of a head
Figure 3:
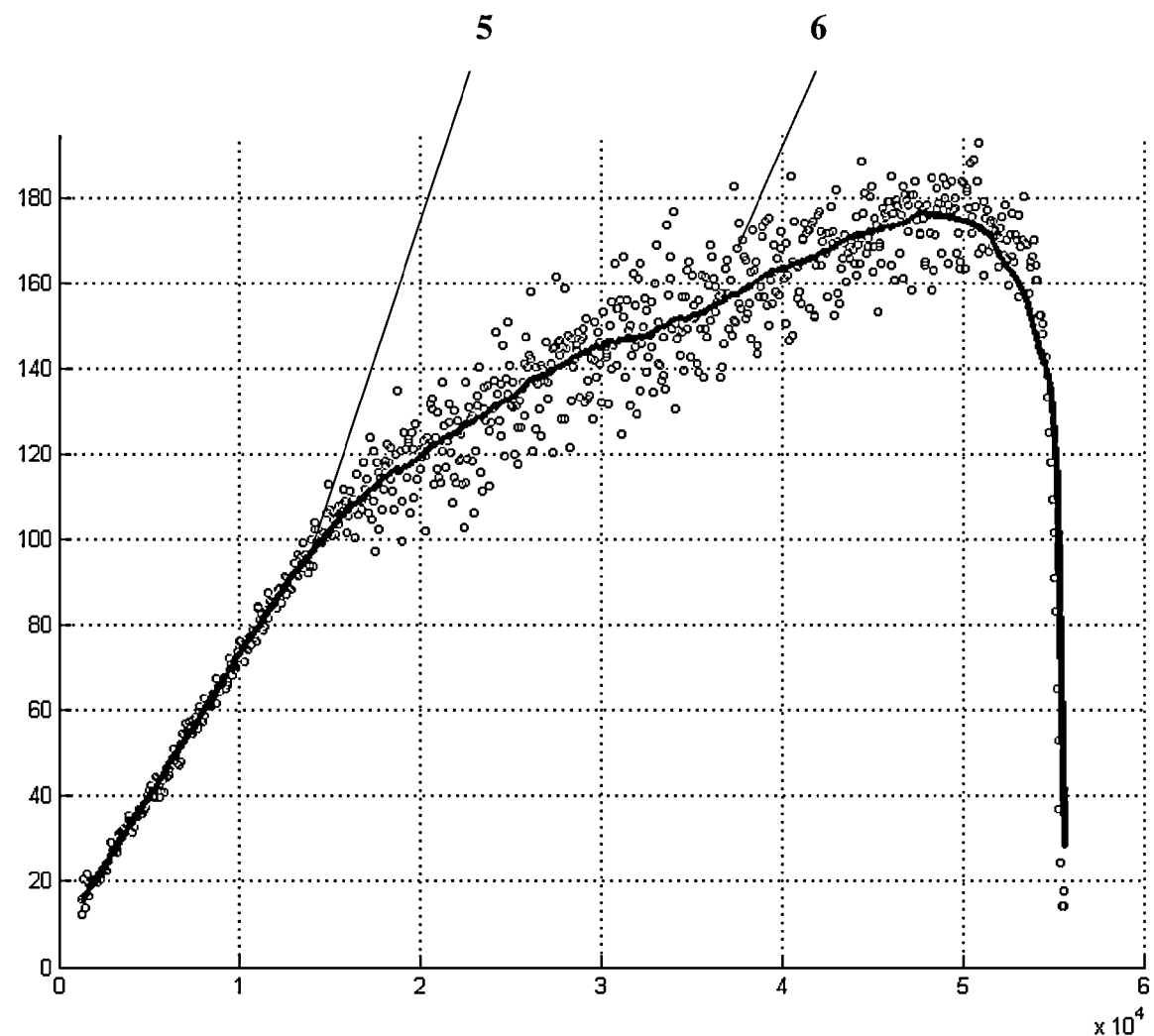
FIG. 3 shows plotted tabulated function 5 (solid line) that defines relationship between standard noise deviation and signal intensity with reference to the image in FIG. 2

The present invention uses non-parametric approach to determination of required relationship, which involves development of interpolating tabulated function based on identified interval estimations of noise variance. Such tabulated function is formed based on robust local linear approximation of interval estimations of noise variance. Application of robust methods allows additional reduction of outlier effects (gross errors in interval variance estimations), while locality of approximation ensures iteration of complex run of a curve, describing dependence of noise on signal intensity. Therefore the resultant tabulated function of each original image intensity associates with noise variance estimation. The function of table entry points can be performed by, e.g., intensities of the estimation image. For a diagram of such single tabulated function (solid line) 5, plotted for the image shown in FIG. 2, alongside with interval estimations of RMS noise deviation 6 (circles), see FIG. 3.

Figure 4:
FIG. 4 shows a map of standard noise deviation of the image in FIG. 2
FIG. 5 A shows effectiveness of the proposed method
FIG. 5 B shows effectiveness of the proposed method
FIG. 5 C shows effectiveness of the proposed method
FIG. 5 D shows effectiveness of the proposed method
FIG. 5 E shows effectiveness of the proposed method
Figure 5A:
Figure 5B:
Figure 5C:
Figure 5D:
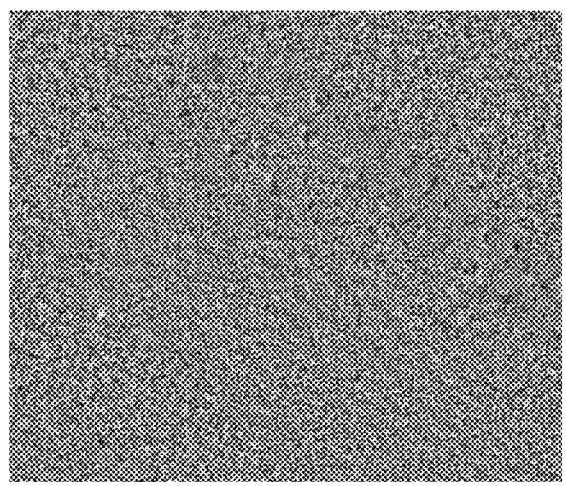
Figure 5E:
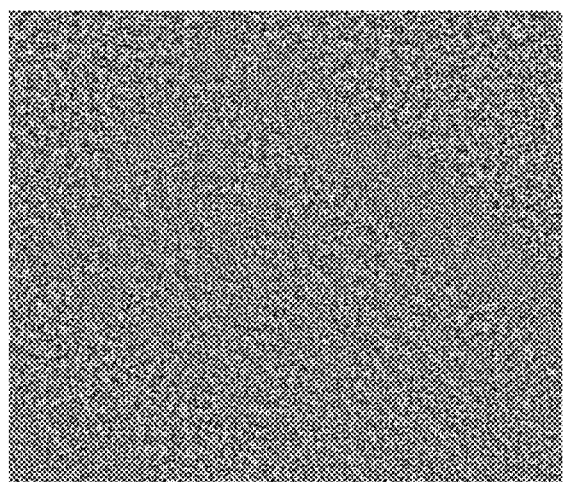

In practice, parametric noise estimation may include an approach that involves a conversion process, stabilizing noise variance in the original image [Starck et. al., Image Processing and Data Analysis: *The Multiscale Approach*. Cambridge University Press, 1998, Yane, *Digital image processing*, Moscow, *Technosphera*, 2007]. In this case, the problem of filtering noise, dependent on signal intensity, is reduced to the challenge of suppression of additive signal-independent noise with preset variance properties. The present invention uses non-parametric noise estimation, therefore it is suggested that the following approach is used in noise map development: building, based on estimation image and interpolating table, a noise map, i.e. an image where each pixel estimates root-mean-square deviation of noise in associated pixel of the original image. The noise map provides pixel-by-pixel noise estimation at precision level, sufficient for practical applications. For a noise map, developed based on image in FIG. 2, see FIG. 4. This example illustrates performance of noise estimation algorithm in overexposure (i.e. sensor saturation/clutter) conditions that can be easily observed around the head (light halo, pos.4) on FIG. 2.

Stage 2. Combined filtering. When standard filtering process (3) is used, as the block size increases, filtering quality, measured in peak values of signal/noise relationship, improves. In addition to quality improvement, in case of application of vectorized non-local mean (4), filter execution speed increases along with pixel block enlargement. However, in highly textured image areas and along abrupt intensity variations (borders), block enlargement leads to relatively high level of residual noise and specific artifacts in the form of discontinuities, directed along local orientation of object borders. Presence of residual noise and artifacts in textured areas can be attributed to decrease of noise suppression rate, which is caused by reduction of the quantity of such blocks. High level of residual noise can also be observed in smooth areas of processed image. The present invention relates to development of combined noise filtering method, based on combination of bilateral filter and non-local means filter, that should improve downsides of the standard method. Such method is hereafter referred to as combined filtering algorithm, or simply combined filter. Combined bilateral non-local filtering is based on the following principle.

Combined bilateral non-local filtering principle. In the course of averaging, weight of each pixel is calculated based on its proximity to the current pixel, using two metrics: bilateral (brightness) and non-local (structural). If the current pixel and the comparison pixel are close from the point of view of non-local means filter, i.e. their blocks are structurally similar, domination of structural weight should be observed. Otherwise, if blocks are not similar, yet current pixel and comparison pixel brightness levels are close, this leads to enhancement of the effect of brightness weight. To reduce residual noise, averaging weights should be calculated based on smoothed (estimation) image, which can be produced by applying a simple linear low-frequency filter to the original image.

Mathematically, this principle leads to the following modification of standard filtering process (3):

$$\hat{u}(p) = \sum_{q \in S(p,t)} w(p,q) u(q) \bigg/ \sum_{q \in S(p,t)} w(p,q). \quad (5)$$

Here, $w(p,q)=V(b(p,q),n(p,q))$ represents a function that defines averaging weight of combined filter, selected in such a way as to satisfy the combined filtering principle; $b(p,q)=G(q-p,a) \cdot F((\bar{u}(p)-\bar{u}(q)), \sigma(\bar{u}(p)), k_b, h_b)$ represents the weight of bilateral filter, and $G(s,a)=\exp(-s \cdot s^T/a^2)$ represents Gaussian function; $n(p,q)=F(\|\bar{U}(p,f)-\bar{U}(q,f)\|_2, \sigma(\bar{u}(p)), k_n, h_n)$ represents the weight of non-local means filter; $\bar{u}(p)$, $\bar{U}(p,f)$ represent the respective values of pixel and pixel block in estimation image; and $\sigma(\bar{u}(p))$ represents the value of RMS error of estimation image noise, dependent on signal intensity. To determine similarity of pixels brightness- and structure-wise, a continuous transition threshold function $F(r,\sigma,k,h)=\exp(-\max(r^2-k \cdot \sigma^2, 0)/h^2)$ is used, where k and h represent parameters.

Vectorized version of combined filtering can be defined as follows:

$$\hat{U}(p_m, f) = \left( \sum_{q \in S(p_m,t)} W(p_m, q, f) \cdot U(q, f) \right) \bigg/ \sum_{q \in S(p_m,t)} W(p_m, q, f). \quad (6)$$

Here, $W(p_m,q,f)=V(B(p_m,q,f),n(p_m,q))$ represents block of values of weight function of combined filter; and $B(p_m,q,f)$ represents block of values of weight function of the bilateral filter, $B(p_m,q,f)=\{b(p_m+s,q+s), s \in S(0,f)\}$, and both such values are calculated as $b(p_m+s,q+s)=G(s,a) \cdot F((\bar{u}(p_m+s)-\bar{u}(q+s)), \sigma(\bar{u}(p_m+s)), k_b, h_b)$, where $G(s,a)$ represents a Gaussian function; $n(p_m,q)=F(\|\bar{U}(p_m,f)-\bar{U}(q,f)\|_2, \sigma(\bar{u}(p_m)), k_n, h_n)$ represents weight of non-local means filter, which is the same for all pixels of the comparison block; $\sigma(u(p_m))$ and $\sigma(\bar{U}(p_m,f))$ represent the value and the RMS error block of estimation image pixel noise, dependent on signal intensity; • represents an operator for bit-by-bit multiplication/division of blocks; and $\hat{U}(p_m,f)$ represents the result estimation of intensities of pixels within the current partition block.

In the combined filtering process, described here (5), (6), it is of importance to properly select weight function V that can be determined by various methods. In terms of execution speed-effective combined filtering algorithm, simple yet quite qualitatively effective version of combined filter can be created by framing weight function as a preset proportion of brightness and structural weights:

$$V(b,n)=(1-\lambda) \cdot b(p,q)+\lambda \cdot n(p,q); \quad (7)$$

and for vectorized version of combined filter:

$$V(B,n)=(1-\lambda) \cdot B(p_m,q,f)+\lambda \cdot n(p_m,q). \quad (8)$$

The selected value of λ should be close to maximum possible non-local means filter weight value, e.g. λ≈0.8. Selection of (7) or (8) weight function allows separating bilateral filter and non-local filter. If filter separation is used, combined filtration comprises sequential bilateral and non-local filtering and further combining obtained results. Separation of filters allows selecting more speed-effective values of filter parameters (e.g. reducing bilateral filter averaging area), as well as eliminating unnecessary bilateral filtering of pixels, associated with regions where partition blocks overlap. By the example of vectorized combined filter (6), when using weight function (8), separable combined filtering can be written down as follows:

$$\hat{U}(p_m,f) = (\lambda \cdot \hat{U}_n(p_m,f) + (1-\lambda) \cdot \hat{U}_b(p_m,f)) \bullet /(\lambda \cdot c(p_m) + (1-\lambda) \cdot C(p_m,f)) \quad (9)$$

Here, $$\hat{U}_n(p_m, f) = \sum_{q \in S(p_m,t)} w(p_m, q) U(q, f)$$

represents the result of filtering by vectorized non-local means filter (without normalizing with respect to total weight); $\hat{U}_b(p_m,f)$ represents an image pixel block, processed by bilateral filter (without normalizing with respect to total weight), therefore $$\hat{U}_b(p_m, f) = \{\hat{u}(s), s \in S(p_m, f) \mid \hat{u}(s) = \sum_{q \in S(s,t)} b(s, q) u(q)\}; c(p_m), C(p_m, f)$$

represents total weight and total weight block of non-local means filter and bilateral filter, respectively.

When separable bilateral filter is used, separable form of combined filtering (9) also allows increasing filtering speed, making it considerably closer to execution speed of vectorized version of non-local means filter.

Effectiveness of combined filtering method (6) with type (8) weight is demonstrated in FIG. 5 (A, B, C, D, E), where: 5A is a fragment of radiological test pattern; 5B is an image that has been processed by vectorized version (4) of standard non-local means filter; 5C is an image that has been processed by combined filter; 5D is a difference between 5A and 5B; and 5E is a difference between 5A and 5C. Artifacts, typical of standard non-local means filtering method, well visible along object borders (figure strips)), turn out to be considerably reduced as a result of application of combined filter.

Stage 3. Low frequency noise suppression. In smooth region of an image (i.e. areas of the same brightness with homoscedasticity manifesting itself as noise), bilateral filter, as well as non-local means filter, shows characteristics of an elementary linear neighborhood averaging filter (i.e. it operates as moving average). Due to using finite averaging region, part of spectral noise components, associated with low frequencies, will not be suppressed and will become well visible in smooth areas of an image.

The present invention uses image pyramid with bilateral linear regression filtering for residual LF noise suppression [Burt et. al., *The Laplacian pyramid as a compact image code*, IEEE Trans. Commun., vol. COM-31, pp. 532-540, April 1983; Tomasi et. al., *Bilateral Filtering for Gray and Color Images, In Proc. 6th Int. Conf Computer Vision*, New Delhi, India, 1998, pp. 839-846]. Image pyramid is constructed based on the following formulae:

$$\begin{cases} A_0(p) = I(p), \\ A_k(p) = \text{Reduce}(A_{k-1}(p)), \\ H_{k-1}(p) = A_{k-1}(p) - \text{Expand}(A_k(p)), k = \overline{1, n} \end{cases} \quad (10)$$

Here, I(p) represents an original image; $A_k(p), H_k(p)$ represents low-frequency (approximating) and high-frequency (detailing) images of level k of the image pyramid; Reduce represents an operator for filtering and double reduction of image sampling rate (decimation), i.e. Reduce(A)=(A*$L_r$) $\downarrow 2$, where $L_r$ represents linear LF filter, and $\downarrow 2$ represents decimation; Expand represents an operator for image downsampling and filtering, i.e. Expand(A)=(A$\uparrow$2)*$L_e$, where $\uparrow$2 represents downsampling, and $L_e$ represents linear low-frequency filter.

Noise variance distribution is estimated based on low-frequency components of the pyramid (10). To achieve that, white Gaussian noise (AWGN) with standard deviation σ is supplied to the combined filter input. Based on the above-mentioned equivalence of combined filter and neighborhood averaging filter in smooth image areas, dependence of LF images RMS error value on pyramid level number is calculated:

$$\begin{cases} \sigma_0 = \sigma/(2 \cdot t + 1), \\ \sigma_k = \sigma_0 \cdot q(k, L_r), k = \overline{1, n}, \end{cases} \quad (11)$$

where $\sigma_0$ represents RMS error level of noise in an image, subjected to combined filtering; $\sigma_k$ represents RMS error level of image noise $A_k(p)$ in pyramid (10); and $q(k, L_r)$ represents reduction rate of RMS error of noise in images $A_k(p)$.

To suppress residual LF noise, images $A_k(p)$ of pyramid (10) are processed by bilateral filtering. To reduce staircasing artifacts [Buades et. al., *The staircasing effect in neighborhood filters and its solution*, IEEE Transactions on Image Processing, Vol. 15 (6), pp. 1499-1505, 2006], bilateral linear regression filter is applied:

$$\hat{a}_k(i,j) = a \cdot i + b \cdot j + c. \quad (12)$$

Parameters (a,b,c) are selected based on functional minimization requirement $$\min_{a,b,c} \left( \sum_{(x,y) \in S(i,j,t)} w(x, y)(a_k(x, y) - a \cdot i - b \cdot j - c)^2 \right);$$

S(i, j, t) represents an area of radius t, centered at the current pixel $a_k(i, j)$ of the image with number k of pyramid (10); w(x, y)=G(x−i, y−j,a)·F(($a_k(i, j) - a_k(x, y)),\sigma_k(i, j))$ represents averaging weight, where spatial proximity of pixels is defined by Gaussian function G(x−i, y−j,a)=exp(−((x−i)$^2$+(y−j)$^2$)/a$^2$), and brightness proximity of pixels is estimated by function F(($a_k(i,j) - a_k(x,y)),\sigma_k(i,j)$)=exp(−($a_k(i,j) - a_k(x,y))^2/\sigma_k^2(i,j)$); $\sigma_k(i, j)$ represents signal-dependent RMS error of approximating pyramid image, defined by noise map and dependence of type (11); and $\hat{a}_k(i, j)$ represents the result estimation of intensity of the current image pixel. To speed up filtering process, separable filter version (12) is used.

Filtered approximating components of the pyramid are used to restore the image with reduced level of residual low-frequency noise $$\hat{A}_{k-1}(p) = \hat{H}_{k-1}(p) + \text{Expand}(\hat{A}_k(p)), k = \overline{n,1}. \quad (13)$$

Here, symbols Â, Ĥ refer to the fact, that construction of pyramid (10) involved filtering of LF images by filter (12).

Stage 4. Over-smoothing correction. In the present invention, over-smoothing of useful high-frequency information is corrected by blending filtered image and its original version together. Blending weights are calculated based on pixel and structural similarities of filtered image and original image. To determine structural similarity, Euclidean distance between pixel blocks of the images is calculated; to determine pixel similarity (intensity similarity), the distance between brightness levels of pixels of the relevant images is calculated.

Let û(p) and u(p) represent intensity values of filtered and original image in pixel p, respectively. In this case, pixel similarity of frames is calculated based on the following threshold function:

$$w_i(p)=\exp(-\max((\hat{u}(p)-u(p))^2-k_i\cdot\sigma^2(u(p)),0)/h_i^2), \quad (14)$$

where $k_i$, $h_i$ represent parameters that define characteristic shape of distribution; and $\sigma^2(u(p))$ represents noise variance value in pixel p. In turn, structural similarity of filtered image and original image is determined based on the following formula:

$$w_s(p)=\exp(\max(-(\|\hat{U}(p)-U(p)\|_2^2-k_s\cdot\sigma^2(u(p)),0)/h_s^2, \quad (15)$$

where $k_s$, $T_s$ represent parameters, defining shape of threshold function; and $\|\hat{U}(p)-U(p)\|_2^2$ represents squared Euclidian distance between pixel blocks of the respective images.

Calculated pixel and structural similarities of the images are combined to determine the final measure of pixel-structural similarity in the following way:

$$w(p)=w_i(p)\cdot w_i(p)+(1-w_i(p))\cdot w_s(p). \quad (16)$$

In this case, over-smoothing correction involves combining filtered image and original noisy image based on the following rule:

$$\hat{u}_c(p)=w(p)\cdot\hat{u}(p)+(1-w(p))\cdot u(p). \quad (17)$$

Setting similarity measure as (16), along with correction based on formula (17), allows filtering individual abrupt image changes (i.e. outliers).

To estimate image noise variance, firstly, estimation image and noise image are obtained by applying to original image I(x, y) the following 3×3 low-frequency linear binomial filter $H_1=[1, 2, 1]/4$, $H=H_1^T\cdot H$. It allows creating smoothed image $I_e(p)=I*H$, where * represents convolution. After that, noise image $N_e(p)=I(p)-I_e(p)$ is calculated.

By removing borders from variance calculations based on noise image $N_e(p)$, images of positive and negative changes are formed:

$$N_e^-(p) = \begin{cases} 1, & N_e(p) < 0 \\ 0, & N_e(p) \geq 0, \end{cases}$$

$$N_e^+(p) = \begin{cases} 1, & N_e(p) > 0 \\ 0, & N_e(p) \leq 0. \end{cases}$$

To separate large areas, associated with borders, these binary images are subjected to step-by-step morphological erosion and dilatation, using masks of 2×2 size:

$$B_e^{-1}(p)=\text{dilate}_{[2\times2]}(\text{erode}_{[2\times2]}(N_e^-(p))), B_e^+(p)=\text{dilate}_{[2\times2]}(\text{erode}_{[2\times2]}(N_e^+(p))).$$

Then these images are combined to create a map of the original image borders $E(p)=B_e^-(p)\cap B_e^+(p)$.

To calculate interval estimations of noise variance, minimum $I_{min}$ and maximum $I_{max}$ of image intensity $I_e(p)$ are determined, increment $h_M$ is selected, and intensity range is partitioned into intervals $M_i$ in increments of $h_M$ (e.g. $h_M=32$). For each image pixel $I_e(p)$, an interval such pixel's value pertains to is identified, and the relevant pixel value of the image $N_e(p)$ is used to calculate noise variance estimation $\sigma^2(i)$ within that interval $M_i$, which involves eliminating pixels with border map value $E(p)=1$. In calculating interval estimation of noise variance, unbiased variance estimator is used:

$$\sigma^2(i) = \sum_{j=1}^{n_i} \left(N_e^i(j) - \overline{N}_e^i\right)^2 / (n_i - 1),$$

where $N_e^i(j)$ represents the value of pixel of noise image $N_e(p)$ from interval $M_i$, $n_i$ represents total amount of accumulated values of noise image pixels within interval $M_i$, and $\overline{N}_e^i$ represents average value of noise pixels within interval $M_i$.

The obtained interval estimations of variance $\sigma^2$ (i) are refined in such a way as to iteratively eliminate in each interval $M_i$ the values of noise pixels that exceed in absolute magnitude a threshold, equal to three standard noise deviations, which is followed by conversion of noise variance estimation in that interval:

$$N_e^i[k+1]=\{N_e(p)|(N_e(p)\in N_e^i[k])\cap(N_e(p)\leq 3\sigma(i))\},$$

where $N_e^i[k+1]$ represents a set of values of noise pixels within interval $M_i$ with iteration k. Further calculations use only intervals, which have accumulated sufficient number of values of noise pixels (e.g. at least 500). Besides, excluded from consideration are intervals with average value $\overline{N}_e^i$ significantly different from zero (deviating from zero by more than a half of interval grid increment $h_M$), as such intervals are most probably dominated by residual values of non-noise pixels.

To estimate relationship of noise variance and intensity, interpolating tabulated function is created based on noise variance estimations obtained. Such tabulated function is formed based on robust local linear approximation of interval estimations of noise variance. For that, on interval grid $M_i$, increment $h_I$ and approximation radius $r_I$ are selected (they can be made dependent on the number of points $n_i$ within intervals $M_i$). Values of variance-intensity tabulated function, developed at the previous stage, are approximated based on the following rule:

$$\hat{\sigma}^2(k\cdot h_I)=a\cdot m_k+b,$$

where k represents the number of approximation node; $m_k$ represents the centre of interval $M_i(k\cdot h_I)$; and parameters a,b are calculated based on sum of absolute deviations [Press et. al., Numerical Recipes in C: The Art of Scientific Computing, Second Edition. New York: Cambridge University Press, 1999]

$$\sum_{j=kh_I-r_I}^{kh_I+r_I} |\hat{\sigma}^2(j) - a\cdot m_k - b| \to \min_{a,b}.$$

The resultant list of values $\{M_i(k\cdot h_I),\hat{\sigma}^2(k\cdot h_I)\}$ is interpolated over the entire range of intensities $[I_{min},I_{msc}]$, thus forming interpolating table of the desired dependence of noise variance on signal intensity.

Further on, based on the estimation image and the interpolating table, a noise map is developed, i.e. an image where each pixel estimates noise variance in associated pixel of the original image.

To ensure proper balance between filtering quality and filtering speed, combined bilateral non-local filtering is performed using formula (9), where $\lambda=0.85$, averaging region radius $t=5$, pixel block radius $f=4$, and blocks are assumed to overlap by 1 pixel. To determine similarity of pixels from the point of view of brightness and structure, a continuous transition threshold function $F(r,\sigma,k,h)=\exp(-\max(r^2-k\cdot\sigma^2,0)/h^2)$ is used, where k and h represent parameters. Parameter value for brightness similarity is assumed as $k_b=9$, and parameter value for structural similarity is assumed as $k_n=2.1$. Values of parameter $h_b$ are selected in such a way as to achieve the pre-set rate of decreasing of function F, which is achieved by setting function value $F(r,\sigma,k,h)$, e.g. as $F=0.1$, at preset threshold value level $k\sigma^2$, e.g. as $k\sigma^2=10\cdot\sigma^2$, which results in parameter value $h_b=9$. In calculation of weight function, geometric distance is not taken in consideration. In similar way, parameter $h_n$ value for non-local means filter weight function is identified: at level $k\sigma^2=3\cdot\sigma^2$, function value is assumed as $F=0.5$, which results in parameter value $h_n=1$. Estimation image, used as a basis for calculation of averaging weights, is determined by filtering the original image with the following LF linear binomial filter of $H_1=[1, 2, 1]/4$, $H=H_1^T\cdot H$ size. The value of parameter $\sigma$ is taken from the noise map, developed at noise estimation stage.

At residual LF noise filtering stage, image pyramid (10) with number of levels n=4 is used, wherein low frequency filter within the Reduce operator is assumed as $L_r=[1, 1]2$, $L_r=L_r^T\cdot L_r$. With this kind of filter, noise RMS error level with low-frequency components of the image pyramid decreases by law of $q(k, L_r)=2^{-k}$, $k=\overline{1,n}$. In the course of construction of the pyramid HF components after downsampling, LF filter $L_e=[1,4,6,4,1]/16$. $L_e=L_e^T\cdot L_e$ is used in Expand operator. For LF filtering, bilateral filter is used, where geometric distance is not taken into account; filter radius is assumed as 5. Weight function parameters coincide with those of weight function of bilateral filter in the combined filter. In calculation of weight function, geometric distance is not taken in consideration.

In over-smoothing correction, to calculate structural similarity, blocks of radius 5 are used. Parameters, defining shape of weight functions, coincide with weight function parameters of the combined filter. In calculation of weight function of intensity-based pixel similarity, geometric distance is not taken in consideration.

References

1. Bilcu R. C., Vehvilainen M. Fast non-local means for image de-noising. In Digital Photography III Proc. of SPIE IS&T, Russel A. Martin, Jeffrey M. DiCarlo, and Nitin Sampat, Eds., February 2007, vol. 6502.
2. Bosco A., Battiato S., Bruna A. R., Rizzo R. Noise Reduction for Cfa Image Sensors Exploiting Hvs Behavior. Sensors 9(3), 1692-1713, 2009.
3. Buades A., Coll B., Morel J.-M. A review of image denoising algorithms, with a new one. Multiscale Modeling and Simulation (SIAM interdisciplinary journal), Vol. 4 (2), pp. 490-530, 2005.
4. Buades A., Coll B., Morel J.-M. Image Denoising by Non-Local Averaging. Proc. of IEEE Int. Conf. on Acoustics, Speech, and Signal Processing, vol. 2, pp. 25-28, March 2005.
5. Buades A., Coll B., Morel J.-M. On image denoising methods. SIAM Multiscale Modeling and Simulation, 4(2):490-530, 2005.
6. Buades A., Coll B., Morel J.-M. The staircasing effect in neighborhood filters and its solution. IEEE Transactions on Image Processing, Vol. 15 (6), pp. 1499-1505, 2006.
7. Burt P., Adelson E. The Laplacian pyramid as a compact image code. IEEE Trans. Commun., vol. COM-31, pp. 532-540, April 1983.
8. Candes E. J., Donoho D. Curvelets, multiresolution representation, and scaling laws. In SPIE conference on Signal and Image Processing: Wavelet Applications in Signal and Image Processing VIII, San Diego, 2000.
9. Dauwe A., Goossens B., Luong H., Philips W. A Fast Non-Local Image Denoising Algorithm. In Proc. SPIE Electronic Imaging, vol. 6812, San Jose, USA, January 2008.
10. Foi A., Trimeche M., Katkovnik V., Egiazarian K. Practical poissonian-gaussian noise modeling and fitting for single-image raw-data. Image Processing, IEEE Transactions on 17, 1737-1754 (October 2008).
11. Foi A. Practical Denoising of Clipped or Overexposed Noisy Images. Proc. 16th European Signal Process. Conf., EUSIPCO 2008, Lausanne, Switzerland, August 2008.
12. Forstner W. Image Preprocessing for Feature Extraction in Digital Intensity, Color and Range images. In Springer Lecture Notes on Earth Sciences, 1998.
13. Gino M. Noise, Noise, Noise. http://www.astrophys-assist.com/educate/noise/noise.htm
14. Hensel M., Lundt B., Pralow T., Grigat R.-R. Robust and Fast Estimation of Signal-Dependent Noise in Medical X-Ray Image Sequences. In Handels, H., et al., ed.: Bildverarbeitung fur die Medizin 2006: Algorithmen, Systeme, Anwendun-gen. Springer (2006) 46-50.
15. Kervrann C., Bourlanger J. Optimal spatial adaptation for patch-based image denoising. IEEE Transactions on Image Processing, vol. 15, no. 10, October 2006.
16. Kingsbury N. G. The dual-tree complex wavelet transform: A new technique for shift invariance and directional filters. In Proc. 8th IEEE DSP Workshop, Utah, Aug. 9-12, 1998, paper no. 86.
17. Liu C., Szeliski R., Kang S. B., Zitnick C. L., Freeman W. T. Automatic estimation and removal of noise from a single image. IEEE Transactions on Pattern Analysis and Machine Intelligence 30(2), 299-314, 2008.
18. Mahmoudi M., Sapiro G. Fast image and video denoising via nonlocal means of similar neighborhoods. IEEE Signal Processing Letters, 12(12):839-842, 2005.
19. Peter J., Govindan V. K., Mathew A. T. Robust estimation approach for nonlocal-means denoising based on structurally similar patches. Int. J. Open Problems Compt. Math., vol. 2, no. 2, June 2009.
20. Press W., Teukolsky S., Vetterling W., Flannery B. Numerical Recipes in C: The Art of Scientific Computing, Second Edition. New York: Cambridge University Press, 1992.
21. Rudin L., Osher S., Fatemi E. Nonlinear total variation based noise removal algorithms. Physica D, 60:259-268, 1992.
22. Salmeri M., Mencattini A., Rabottino G., Lojacono R. Signal-dependent Noise Characterization for Mammographic Images Denoising. IMEKO TC4 Symposium (IMEKOTC4 '08), Firenze, Italy, September 2008.
23. Selesnick I. W. The double-density dual-tree discrete wavelet transform. IEEE Trans. Signal Processing, vol. 52, no. 5, pp. 1304-1314, May 2004.

24. Starck J., Murtagh F., Bijaoui A. Image Processing and Data Analysis: The Multiscale Approach. Cambridge University Press, 1998.
25. Strang G., Nguyen T. Wavelets and Filter Banks. Wellesley-Cambridge Press.
26. Takeda H., Farsiu S., Milanfar P. Kernel regression for image processing and reconstruction. IEEE Transactions on Image Processing, vol. 16, no. 2, pp. 349-366, February 2007.
27. Tomasi C., Manduchi R. Bilateral Filtering for Gray and Color Images. In Proc. 6th Int. Conf. Computer Vision, New Delhi, India, 1998, pp. 839-846.
28. Vetterli M., Kovacevic J. Wavelets and Subband Coding. Prentice Hall, Englewood Cliffs, N.J., 1995.
29. Waegli B. Investigations into the Noise Characteristics of Digitized Aerial Images. In: Int. Arch. For Photogr. And Remote Sensing, Vol. 32-2, pages 341-348, 1998.
30. Wang J., Guo Y., Ying Y., Liu Y., Peng Q. Fast non-local algorithm for image denoising. In Proc. Of IEEE International Conference on Image Processing (ICIP), 2006, pp. 1429-1432.
31. Weickert J. Anisotropic Diffusion in Image Processing. Tuebner Stuttgart, 1998.
32. Yane B., Digital image processing. Moscow, Technosphera, 2007, p. 583

What is claimed is:

1. A method for noise suppression in digital X-ray images, comprising:
    acquiring an original image;
    estimation of a signal-dependent noise variance dependent on signal intensity;
    combined bilateral non-local filtering;
    suppressing residual low-frequency noise; and
    over-smoothing correction,
    wherein the estimation of a signal-dependent noise variance dependent on signal intensity comprises:
        morphological elimination of the values of noise image pixels corresponding to edges in the original image;
        using robust piecewise linear approximation of interval estimations of noise variance to obtain a tabulated function of dependence of noise on signal strength; and
        calculating a noise map as a pixel-by-pixel estimation of noise variance in the original image;
    wherein the combined bilateral non-local filtering comprises averaging by combining non-local means filter and bilateral filter weights;
    wherein suppressing residual low-frequency noise comprises using a pyramid method with filtering of low-frequency by a bilateral filter;
    further comprising obtaining a result image; and
    wherein the over-smoothing correction comprises combining the final image and the original image based on structural and pixel similarity between the filtered image and the original image.

2. The method of claim 1, further comprising calculating the averaging weights for combined bilateral non-local filtering using the original image smoothed by a linear low frequency filter.

3. The method of claim 1, wherein the combined bilateral non-local filtering comprises using a combined weight function as fixed weight fractions for the non-local means filter and the bilateral filter, wherein these filters are combined at a final stage.

4. The method of claim 1, wherein the combined bilateral non-local filtering comprises using a separable version of the bilateral filter for separation of the non-local means filter and the bilateral filter.

* * * * *